US008023392B2

(12) United States Patent
Ling et al.

(10) Patent No.: US 8,023,392 B2
(45) Date of Patent: Sep. 20, 2011

(54) COMPENSATING THE EFFECTS OF NON-SYNCHRONOUS WRITING OF ERASABLE SERVO MARKS

(75) Inventors: Qiang Ling, Pittsburgh, PA (US); Mehmet Fatih Erden, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 1312 days.

(21) Appl. No.: 11/639,728

(22) Filed: Dec. 15, 2006

(65) Prior Publication Data

US 2008/0144452 A1 Jun. 19, 2008

(51) Int. Cl.
*G11B 9/00* (2006.01)

(52) U.S. Cl. ...................................... 369/126

(58) Field of Classification Search ........... 369/126, 369/120, 121, 125, 14, 15; 360/77.08, 77.11, 360/48, 21; 365/151, 145
See application file for complete search history.

(56) References Cited

U.S. PATENT DOCUMENTS

| 4,748,609 A | 5/1988 | Yonezawa et al. ............. 369/44 |
| 5,050,016 A | 9/1991 | Squires ...................... 360/77.08 |
| 5,293,276 A | 3/1994 | Dunn et al. ...................... 360/51 |
| 5,381,281 A | 1/1995 | Shrinkle et al. ............ 360/77.08 |
| 5,384,671 A | 1/1995 | Fisher ............................. 360/51 |
| 5,978,326 A * | 11/1999 | Shido ............................. 369/126 |
| 6,014,276 A | 1/2000 | Takase ........................... 360/49 |
| 6,233,715 B1 | 5/2001 | Kuki et al. ..................... 714/795 |
| 6,445,667 B1 | 9/2002 | Bernacki et al. ............. 369/100 |
| 6,751,035 B1 * | 6/2004 | Belser ........................ 360/77.08 |
| 6,856,480 B2 | 2/2005 | Kuki et al. ...................... 360/49 |
| 6,947,233 B2 | 9/2005 | Toda ................................ 360/51 |
| 2002/0048107 A1 * | 4/2002 | Bryant et al. .................... 360/75 |
| 2006/0023606 A1 * | 2/2006 | Lutwyche et al. ............ 369/100 |
| 2006/0039250 A1 * | 2/2006 | Cherubini et al. ............ 369/126 |

FOREIGN PATENT DOCUMENTS

WO WO 2007/096919 A1 * 8/2007

* cited by examiner

*Primary Examiner* — Tan X Dinh
(74) *Attorney, Agent, or Firm* — David D. Brush; Westman, Champlin & Kelly, P.A.

(57) ABSTRACT

A method is provided, which includes reading data from a data storage medium. Reading data from the medium causes the data to be erased. The method further includes determining a desired position to rewrite the data by computing a position error signal based on the data signal and compensating the position error signal for non-zero bias. The data is then rewritten non-synchronously. An apparatus is also provided, including a data storage medium with a data communication transducer configured to receive data from the medium. Data is erased after it is read. The data communication transducer is configured to rewrite the read data back onto the data storage medium in a non-synchronously. A non-zero bias compensator is provided to compensate data received by the data communication transducer to determine a desired position to rewrite the previously read data back onto the medium.

16 Claims, 9 Drawing Sheets

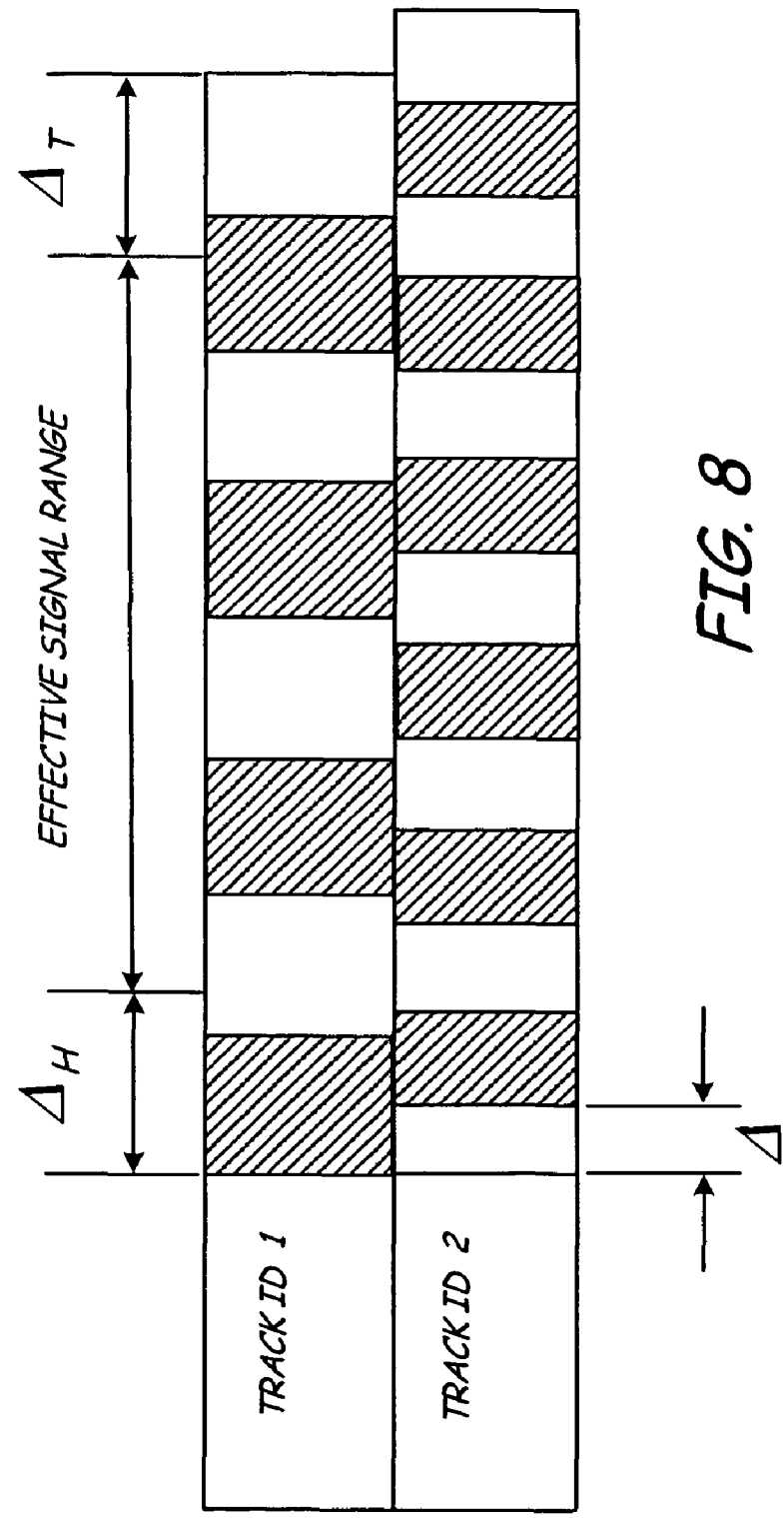

COMPENSATING THE EFFECTS OF NON-SYNCHRONOUS WRITING OF ERASABLE SERVO MARKS

FIELD OF THE DISCLOSURE

The present disclosure relates generally to data storage media, and more particularly but not by limitation to communicating with the data storage media where information is erased after being accessed.

BACKGROUND

In data storage systems, digital data are written to and read from data storage media. One well-known type of data storage system is a disk drive, which reads and writes information along concentric tracks formed on disks. Read and write operations are performed through a transducer, which is typically carried on a slider body. To locate a particular track on a disk, disk drives typically use embedded servo fields on the disk. These embedded fields are utilized by a servo subsystem to position a transducer such as read/write head over a particular track. In a disk drive, the servo subsystem includes a controller that is attached to the transducer to control its spatial position by moving it according to its input position error signal (PES).

Another type of data storage system is known as a probe storage system, which reads and writes information using multiple transducers that read stored data from storage material. Like magnetic disk drives, probe storage devices use servo marks to locate data stored on the medium. In some instances, the data stored in these devices is rewritten after each read. Once the data stored on this type of material is read, that specific data will be erased, including the servo marks used to identify the position of the data. The write process is executed by the ordinary write transducer in a non-synchronous method. For example, multiple tracks of servo marks are written on the medium and they are written consecutively, instead of concurrently. Due to such non-synchronous writing, the data may not be rewritten back exactly at the expected position Examples of the type of factors that may influence the positioning of the data transducer when attempting to write data onto the medium include electrical or electronics noise and jitter noise.

Thus, there is a need for systems and methods for interfacing with a data storage medium to compensate for the effects of non-synchronous writing.

SUMMARY

Aspects of the present disclosure relate to compensating the effects of non-synchronous writing of data onto data storage systems. In one particular aspect, a method is provided. The method includes reading data from a data storage medium. The step of reading the data causes the data to be erased from the medium. The method further includes determining a desired position rewrite the data onto the data storage medium, including computing a position error signal based on the read data and compensating the position error signal for non-zero bias. The data is then rewritten onto the data storage medium in a non-synchronous manner.

In another aspect, a method is provided that includes reading data from a data storage medium. The data includes servo marks located on a first track and a second track, and the step of reading the data causes the data to be erased from the medium. The method further includes rewriting the data onto the data storage medium. The method determines a desired position to write data on the first track by computing a position error signal based on the data signal received from the data storage medium and compensating the position error signal for non-zero bias. The data is then written onto the first track. The method also determines a desired position to write data on the second track.

In yet another aspect an apparatus is provided. The apparatus includes a data storage medium and a data communication transducer configured to receive data from the data storage medium. The data is erased after it is read. The data communication transducer is configured to rewrite the read data back onto the data storage medium in a non-synchronous manner. A non-zero bias compensator is also provided. The non-zero bias compensator is configured to compensate data received by the data communication transducer to determine a desired position to rewrite the previously read data back onto the data storage medium.

These and other features and benefits that may characterize aspects of the present disclosure will be apparent upon reading the following detailed description and review of the associated drawings.

BRIEF DESCRIPTION OF THE DRAWINGS

FIG. 8 is a schematic diagram illustrating track incoherence on a storage medium.

DETAILED DESCRIPTION

Figure 1:
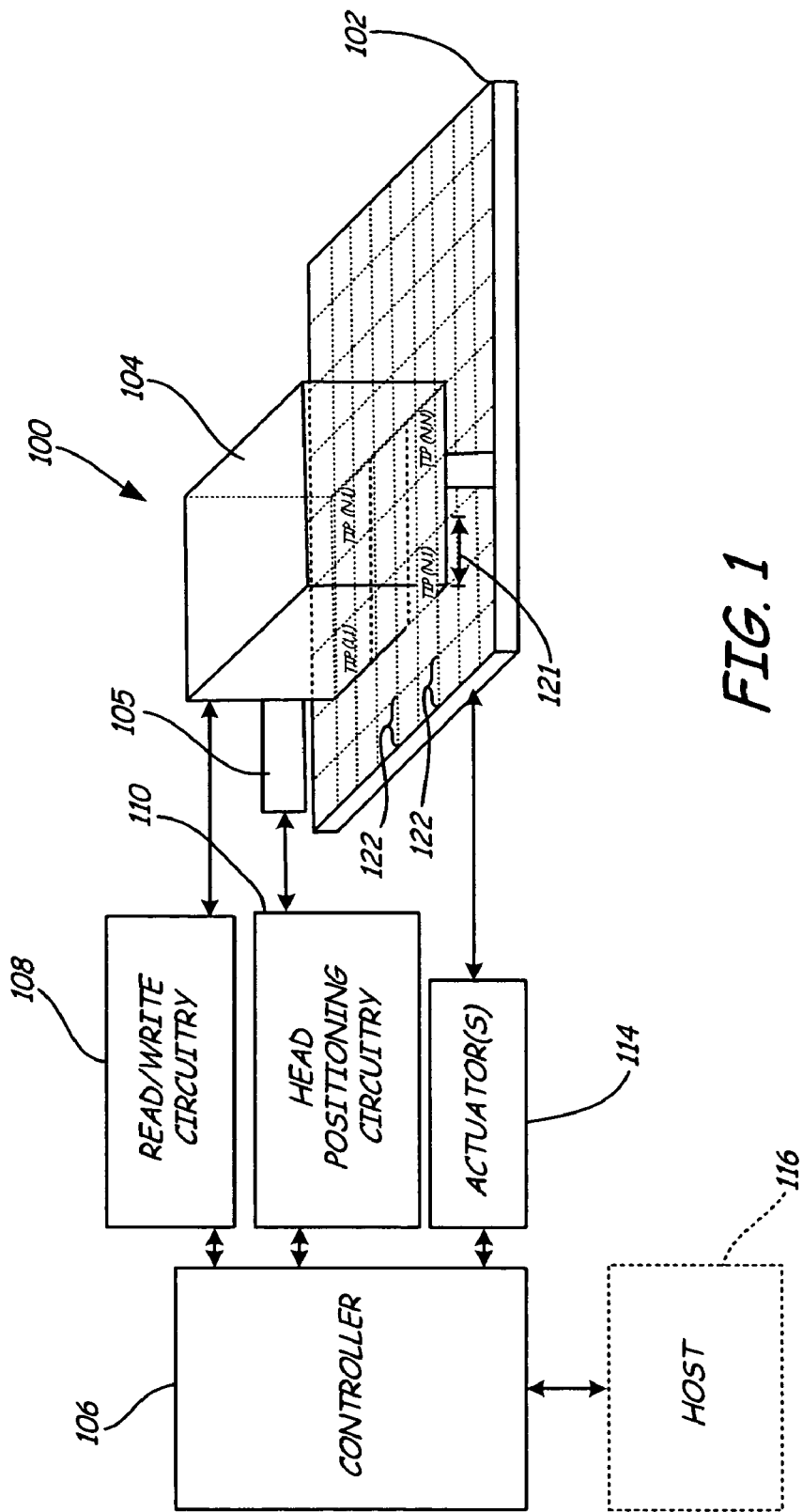
FIG. 1 illustrates a data storage system having a storage media that is scanned by an array of data probe tips or transducers.

As illustrated in FIG. 1, system 100 includes a data storage medium 102 and a transducer array 104 (also referred to as a probe array) that communicates data to and receives data from data storage medium 102. Data storage medium can be made of a ferroelectric material or other suitable materials. Individual track transducers (or probe tips) of the array of transducers 104 are represented by TIP (1,1), TIP (N,1), TIP (1,N), etc., in FIG. 1. System 100 is also referred to as a probe storage system. In system 100, the transducer array 104 is supported by a single arm 105, for example. Other primary components of system 100 include a controller 106, read/write circuitry 108, transducer positioning circuitry 110, and actuators 114. Transducer positioning circuitry 110 controls the position of the transducer array 104 with respect to the data storage medium 102. Controller 106 coordinates and controls the operation of read/write circuitry 108, transducer positioning circuitry 110, and actuators 114 in addition to communicating information with a host system 116. Host system 116 can include a micro-processor-based data processing system such as a personal computer, a hand-held device, or other system capable of performing a sequence of logical operations. Read/write circuitry 108 helps convert data received from host system 116 into a form suitable for writing a medium 102. Also, circuitry 108 helps convert data read by transducer array 104 into a form suitable for communication to host 116. Actuators 114 help provide relative scanning motion between data storage medium 102 and transducer array 104, and can operate on one or both of the data storage medium 102 and the data transducer array 104.

In some aspects, each segment/area 122 (area of medium 102 spanned by tips, along tip scanning width 121) can include both position information (servo marks) and user data (data marks). In addition, dedicated probe tips that only read and/or write servo marks (producing dedicated servo sectors) and dedicated data tips that only read/write data marks (producing dedicated data sectors) can be used. Servo and/or data marks are, in some cases, erased on read-back, thereby requiring that the marks are rewritten after being read.

Figure 2:
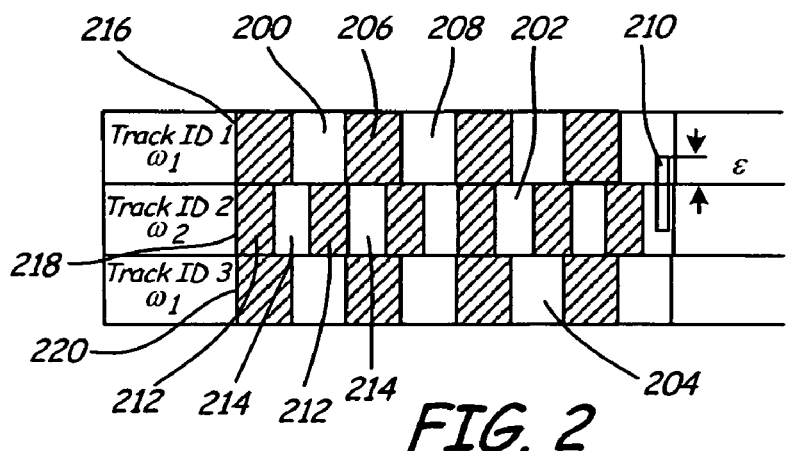
FIG. 2 is a schematic representation of an expected pattern of multiple tracks of data written onto a data storage medium of the data storage system of FIG. 1.

FIG. 2 illustrates a schematic representation of a first track 200, a second track 202, and a third track 204 (also indicated by Track ID 1, Track ID 2, and Track ID 3, respectively) of data applied to the ferroelectric data storage medium 102. In one aspect, the data on the tracks 200, 202, and 204 are servo marks, indicative of position of data on the data storage medium 102 (FIG. 1).

First track 200 illustrates an exemplary pattern of sequential writing of logical "one" bits 206 and "zero" bits 208. The bits in first track 200 are illustratively written in an alternating logical one bit/zero bit sequence having a first frequency $\omega_1$. Similarly, second track 202 is shown with an alternating pattern of one bits 212 and zero bits 214. Second track 202 is written at a second frequency $\omega_2$, which differs from first frequency $\omega_1$. As with the first track 200 and the second track 202, a third track 204 of servo marks is written with alternating one bit 218 and zero bit 220. The third track 204 is illustratively written at the first frequency $\omega_1$. It is to be understood that although the first, second, and third tracks 200, 202, and 204 are illustrated as having alternating patterns of a single one bit followed by a single zero bit, alternatively, a data pattern written on the first, second, and third tracks may differ. For example, as discussed below, a data pattern for a servo mark may include a single one bit followed by a plurality of zero bits.

It should also be understood that although the data on the first, second, and third tracks 200, 202, and 204 are written in patterns of differing frequencies, $\omega_1$ and $\omega_2$, other patterns of servo data can be employed. For example, the data can be written onto first, second, and third tracks 200, 202, and 204 at the same frequency, but with the data on the second track 202, for example being out of phase with the data on the first track 200. Such a pattern is known as a "phase pattern." In some instances, the data on the second track 202 can be completely, or 180 degrees, out of phase with the first track, a pattern known as a "null pattern." In addition, other patterns can be employed without departing from the scope of the disclosure.

Track transducer 210 is used to read and write data to and from the data storage medium 102 (shown in FIG. 1). Track transducer 210, in the illustrative aspect, has approximately the same width as that of each track, so that no more than one track can be written at a time by one track transducer. Thus, data on the first, second, and third tracks 200, 202, and 204 are written in a non-synchronous manner. For example, the track transducer 210 moves to a first track position 216, writes the first track 200. Then, the track transducer 210 moves to a second track position 218 and writes the second track 202. Similarly, the track transducer 210 moves to a third track position 220 and writes the third track 204. Because the servo tracks are written in a non-synchronous manner, it is possible to realize some variation (left or right in FIG. 2) with respect to the position of the data written as compared to the desired position of the data. The variation, as is discussed below, between the expected and actual positions can be affected by a number of factors including, without limitation, servo position jitter and electrical or electronics noise.

When data is read from the tracks 200, 202, and 204, the track transducer 210 moves across the tracks anywhere along the three tracks 200, 202, and 204. For example, in FIG. 2, the track transducer 210 is positioned so that a portion of the track transducer 210 moves over, and receives an input signal from, both the first and second tracks 200 and 202. Thus, a portion of the track transducer 210 is reading a signal having a frequency of $\omega_1$ and a portion of the track transducer 210 is reading a signal having a frequency of $\omega_2$.

Figure 3A:
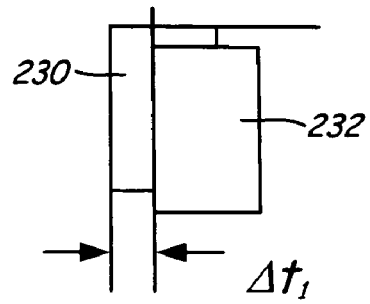
FIG. 3A illustrates the effects of jitter on the writing of data onto the data storage medium.

FIG. 3A illustrates the effects of noise on determination of a position to write a data bit. Desired position 230 of a servo mark is shown relative to the actual position 232 of a representative servo mark written onto the data storage medium 102. The lateral offset between the actual position 232 and the expected position 230 position of a particular data bit such as a servo mark is described as $\Delta t_l$ where l is the lth data bit and $\Delta t_l$ is the distance between the desired and actual position of the data bit.

Figure 3B:
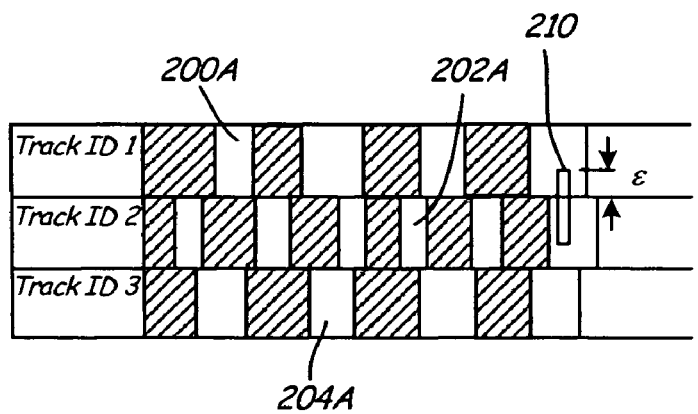
FIG. 3B illustrates the effects of jitter on the writing of data onto several tracks in the data storage medium.

FIG. 3B illustrates a representative pattern of data on tracks 200A, 202A, and 204A, which show the effects of noise on the writing of data. As can be seen, the width of the logical "one" bits and "zero" bits have been impacted, causing an irregular frequency. Repeated readings of data and the subsequent compounding effect of the position error on each of the subsequent writings can eventually cause loss of the servo marks and corresponding loss of data.

Figure 4:
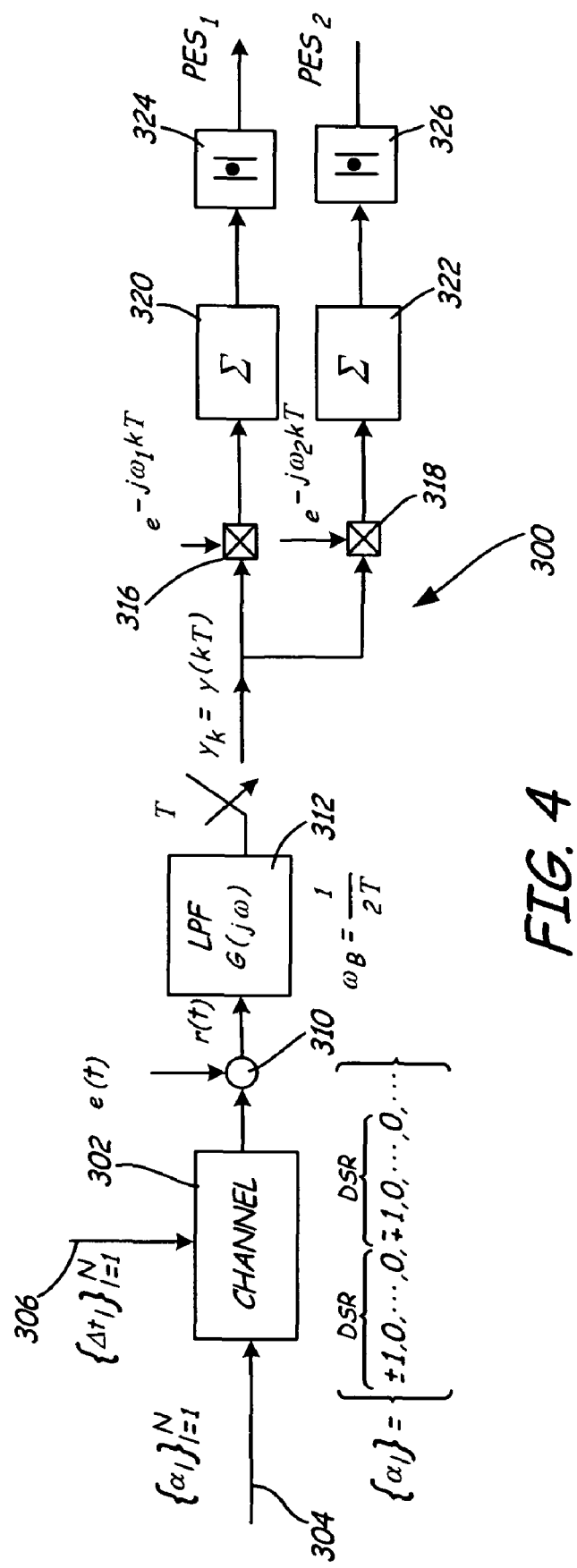
FIG. 4 is a block diagram illustrating a mathematical system used to calculate the positioning of a data probe transducer with respect to the data storage medium.

In order to offset the compounding effects of position error on the positioning of data probe transducers during a rewriting operation, it is necessary to understand the nature of the factors that can cause position error. FIG. 4 illustrates a model 300 for estimating the position error signal (PES) associated with servo marks onto the erasable data storage medium 102.

Channel 302 represents the input of data marks read from the digital storage medium. The inputs to channel 302 include a transition sequence 304, which is read from the data storage medium 102, and jitter noise 306. The transition sequence 304 represents transitions in data on the data storage medium and is represented as $a_l$, where $a_l \in \{-1, 1, 0\}$ with $-1$, $1$, and $0$ indicating negative, positive, and no transitions respectively.

As a rule, servo marks are usually written in much lower bit density than data marks. The density of data marks to servo marks is represented as DSR. It is assumed that DSR is an integer. The transition sequence 304 (or servo mark pattern) illustratively includes one nonzero transition followed by (DSR−1) zero transitions. Jitter noise is represented as an input to channel 302 as $\{\Delta t_l\}$. Jitter noise is represented in the model 300 by truncating an independent and identically distributed Gaussian process with zero mean and a variance of $\sigma_j^2$ into the range of $[-T/2, T/2]$, where T stands for the data bit length.

The transition response from channel 302 is represented as $h(t,W)$. The transition response from the channel is characterized by:

$$h(t, W) = V_p \cdot \mathrm{erf}\left(\frac{2\sqrt{\ln 2}}{W} t\right)$$

where W is the width of $h(t,W)$ at 50% of its peak value and $\mathrm{erf}(t)$ is the error function defined as:

$$\mathrm{erf}(t) = \frac{2}{\sqrt{\pi}} \int_0^t e^{-x^2} dx$$

and Vp is a constant, defined as $$V_p = \frac{1}{2}\left(\frac{\pi}{2W^2 \ln 2}\right)^{0.25}.$$

The transition response of channel 302, is summed with electronics noise function $e(t)$ at summation 310. Electronics noise $e(t)$ is modeled as Additive White Gaussian Noise (AWGN) with zero mean and the single-sided power spectral density of $N_O$. $N_O$ is determined by the signal-noise-ratio (SNR) as $$SNR = 10\log_{10}\left(\frac{E_i}{N_O}\right),$$

where $E_i$ is the energy of the impulse response of the channel and assumed to be 1. The output of the summation 310 is thus a readback signal with a noise factor summed in and is represented by $r(t)$. The output $r(t)$ from summation 310 can be expressed as:

$$r(t) = \sum_{l=0}^{N} a_l h(t - lT - \Delta t_l, W) + e(t).$$

Output $r(t)$ is then filtered at filter 312. Filter 312 is a continuous time filter (CTF), which is represented by $G(j\omega)$. The CTF is low pass filter with a bandwidth of:

$$\omega_B = \frac{\pi}{T} (\mathrm{rad}/s)$$

The output of the filter 312 is represented by $y(t)$ and is sampled at the rate of $1/T$ Hz. The sampled signal $y_k$ is mixed, that it is to say, multiplied with $e^{-j\omega_1 kT}$ at 316 and $e^{-j\omega_2 kT}$ 318. The respective mixed samples are summed (averaged) at 320 and 322 and the magnitude of the complex results are extracted at 324 and 326 to generate the position error signals ($PES_i$, where i=1, 2) associated with the first and second frequencies, $\omega_1$ and $\omega_2$.

Model 300 assumes that the width of the track transducer and the track width are equal. Thus, the displacement $\epsilon$ of the track transducer (that portion that is not in the middle track) is less than the width of the track. These assumptions are represented as follows:

$$\begin{cases} W_{track} = W_{head} \\ -W_{track} \leq \varepsilon \leq W_{track} \end{cases}$$

It is also assumed that the total read-back signal $r(t)$ is a linear combination of read-back signals over all tracks, $y_n(t)$ (n=1, 2, 3). The function $y_n(t)$ is the response signal when the transducer is totally in track n and there is no electronics noise, other than the jitter of servo marks. For a given transducer displacement, $\epsilon$, the length of the transducer over track n is represented as $q_n(\epsilon)$. As an example, the transducer displacement in FIG. 2 provides the following values for $q_n(\epsilon)$: $q_1(\epsilon)=\epsilon$, $q_2(\epsilon)=W_{track}-\epsilon$ and $q_3(\epsilon)=0$. The total output $y(t)$ is expressed as:

$$y(t) = \sum_{n=1}^{3} \frac{q_n(\varepsilon)}{W_{track}} y_n + e_g(t),$$

where $e_g(t)=e(t)*g(t)$ and $g(t)$ is the impulse response of the CTF 312.

In the case where there is no noise, that is, where $e(t)=0$, the PES is represented as $$PES_i = \left| \sum_{k=0}^{N} y(kT) e^{-j(\omega_i kT)} \right|, i = 1, 2.$$

It can be shown that $$PES_i = \left| \frac{|\varepsilon|}{W_{track}} R_{i,1} + \left(1 - \frac{|\varepsilon|}{W_{track}} R_{i,2}\right) \right|$$

where $$R_{i,n} = \sum_{k=0}^{N} y_n(kT) e^{-j\omega_i kT}, i = 1, 2; n = 1, 2.$$

$R_{1,1}$ and $R_{2,2}$ are almost proportional to N. Therefore, the larger N, that is, the more servo bits there are, the more sensitive $PES_i$ is with respected to transducer displacement, $\epsilon$. The cross sensitivity parameters $|R_{1,2}|$ and $|R_{2,1}|$ are relatively small compared to $|R_{1,1}|$ and $|R_{2,2}|$. Thus, $PES_i$ can be approximated as:

$$\begin{cases} PES_1 \approx \frac{|\varepsilon|}{W_{track}}|R_{1,1}| \\ PES_2 \approx \left(1 - \frac{|\varepsilon|}{W_{track}}\right)|R_{2,2}| \end{cases}.$$

Thus, both $PES_1$ and $PES_2$ are linear with respect to $|\varepsilon|$. Thus, $|\varepsilon|$ can be estimated ($\hat{\varepsilon}$) as follows:

$$\begin{cases} \hat{\varepsilon}_1 = W_{track}\left|\frac{PES_1}{R_{1,1}}\right| \\ \hat{\varepsilon}_2 = W_{track}\left(1 - \left|\frac{PES_1}{R_{2,2}}\right|\right) \end{cases}$$

with the estimation error, $\Delta\varepsilon_i$, defined as $\Delta\varepsilon_i = \hat{\varepsilon}_i - |\varepsilon|$, $i=1,2$. The estimate of $|\varepsilon|$ is a combination of $\hat{\varepsilon}_1$ and $\hat{\varepsilon}_2$, represented as $\hat{\varepsilon} = c_1\hat{\varepsilon}_i + c_2\hat{\varepsilon}_i$, where $c_i \geq 0$ ($i=1,2$) and $c_1+c_2=1$. It should be understood that $\hat{\varepsilon}_1$ is the estimation error based on the portion of the data provided by the track having a frequency of $\omega_1$ and $\hat{\varepsilon}_2$ is the estimation error based on the portion of the data provided by the track having a frequency of $\omega_2$.

Figure 5A:
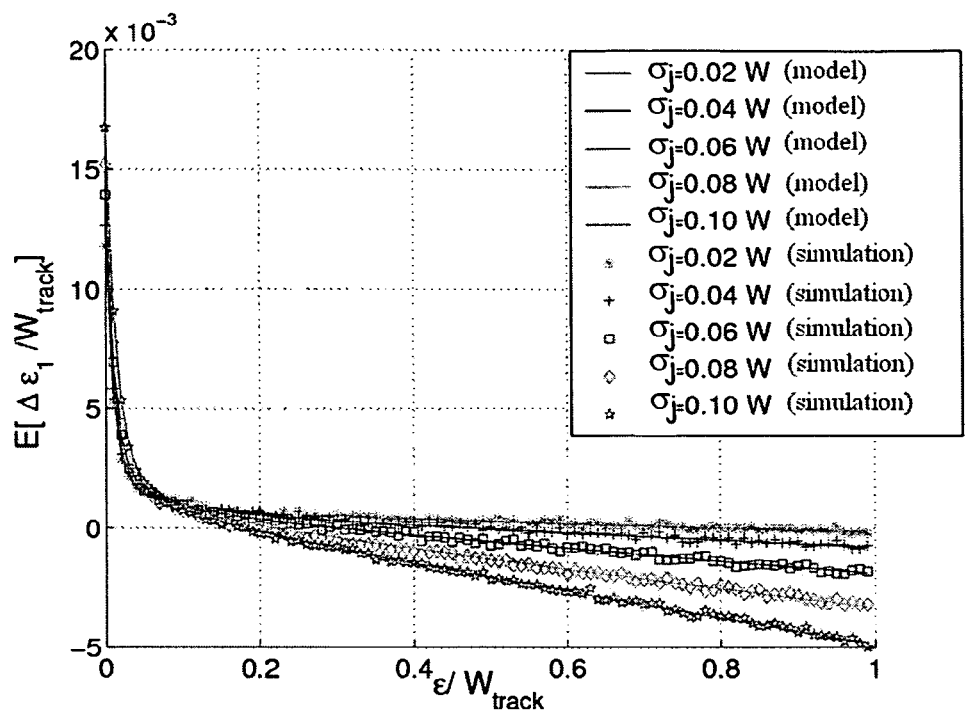
FIG. 5A is a graphical illustration of data collected in a simulation using the model FIG. 4 of the mean of a first position estimation error of a data probe transducer plotted against the actual displacement of the probe transducer.
Figure 5B:
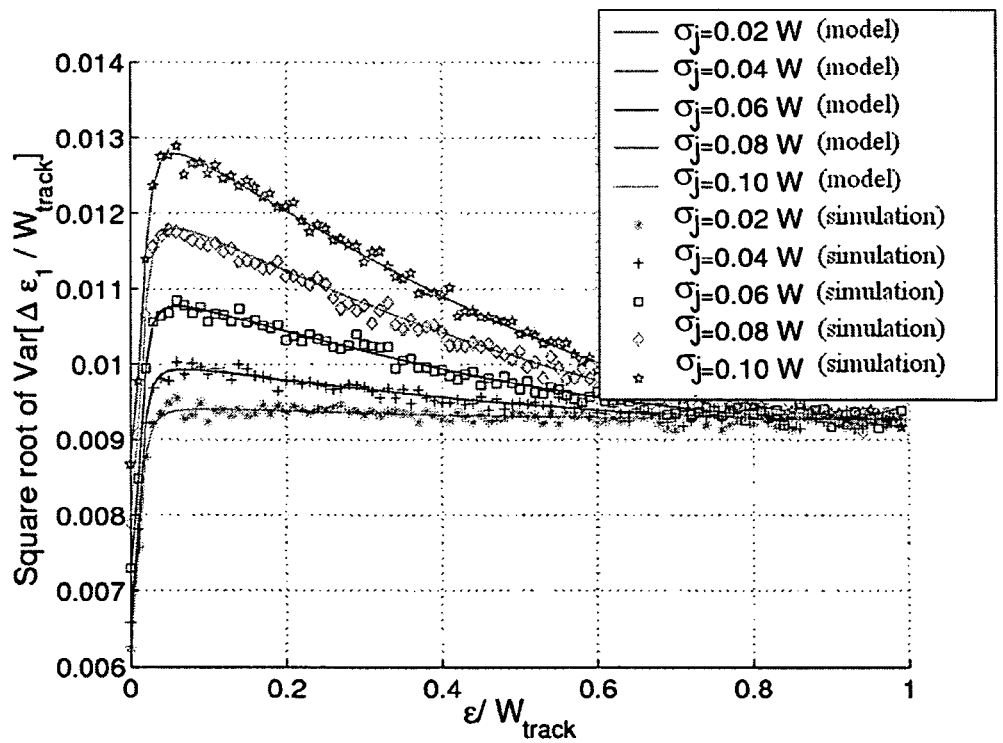
FIG. 5B is a graphical illustration of the variance of the first position estimation error data collected and illustrated in FIG. 5A.
Figure 5C:
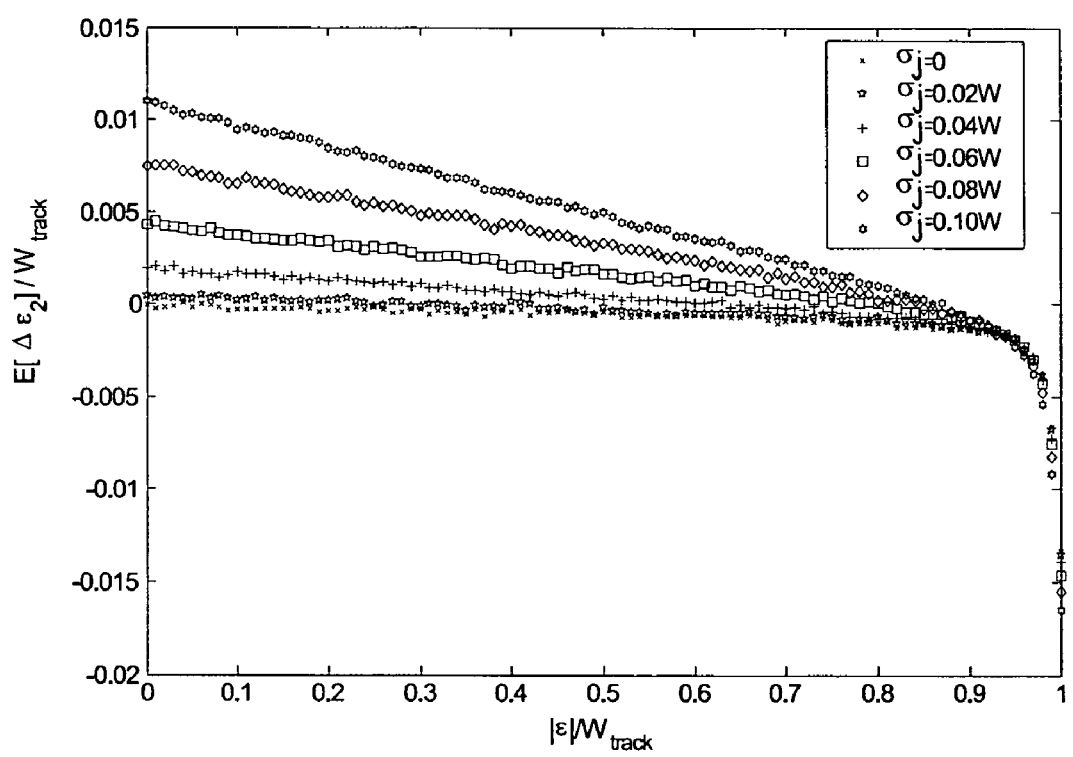
FIG. 5C is a graphical illustration of data collected in a simulation using the model FIG. 4 of the mean of a second position estimation error of a probe transducer plotted against the actual displacement of the probe transducer.

The estimations of PES described above work well for noise-free systems. However, real systems include noise from such noise sources as jitter of servo marks and electrical or electronics noise. In model 300, estimation error $\Delta\varepsilon_i = \hat{\varepsilon}_i - |\varepsilon|$, ($i=1,2$) is a random variable and is a function of both electronics noise, $e(t)$, and jitter, $\{\Delta t_j\}$. To determine the effect of each of the noise sources, the mean and variance of $\Delta\varepsilon_i$ must be determined. The mean and variance of $\Delta\varepsilon_i$ can be determined through numeric simulations or theoretical methods. Using model 300, with electronics noise $e(t)$ chosen so that the signal to noise ratio is 20 dB and jitter of servo marks chosen as $\sigma_j \in \{0, 0.02W, \ldots, 0.10W\}$, numerical simulations have been employed to compute the mean, $E|\Delta\varepsilon_i|$, and variance, $Var |\Delta\varepsilon_i|$, of the estimation error. The results of these simulations are shown in graphical form in FIGS. 5A-5C. FIG. 5A shows the mean $E|\varepsilon_1|$ of $\Delta\varepsilon_1$ and FIG. 5C shows the mean $E|\Delta\varepsilon_2|$ of $\Delta\varepsilon_2$. FIG. 5B shows the $Var |\Delta\varepsilon_1|$, of $\Delta\varepsilon_1$. The results in FIGS. 5A-5C indicate that a non-zero bias of position estimation exists.

Figure 6A:
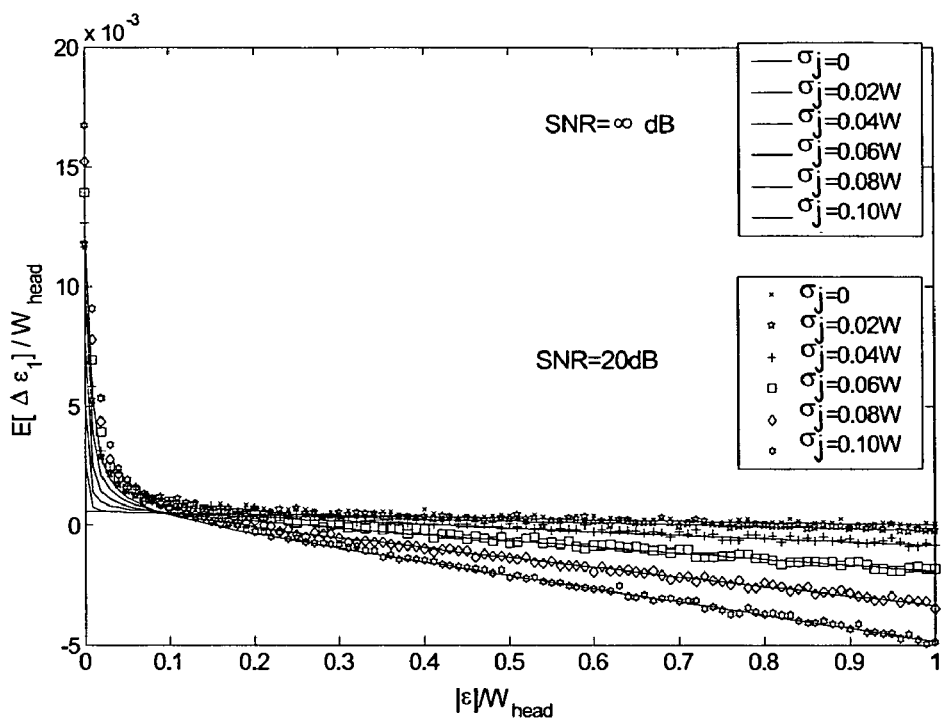
FIG. 6A is a graphical illustration of the effect of non-zero bias on the estimation error from a first position estimation signal.
Figure 6B:
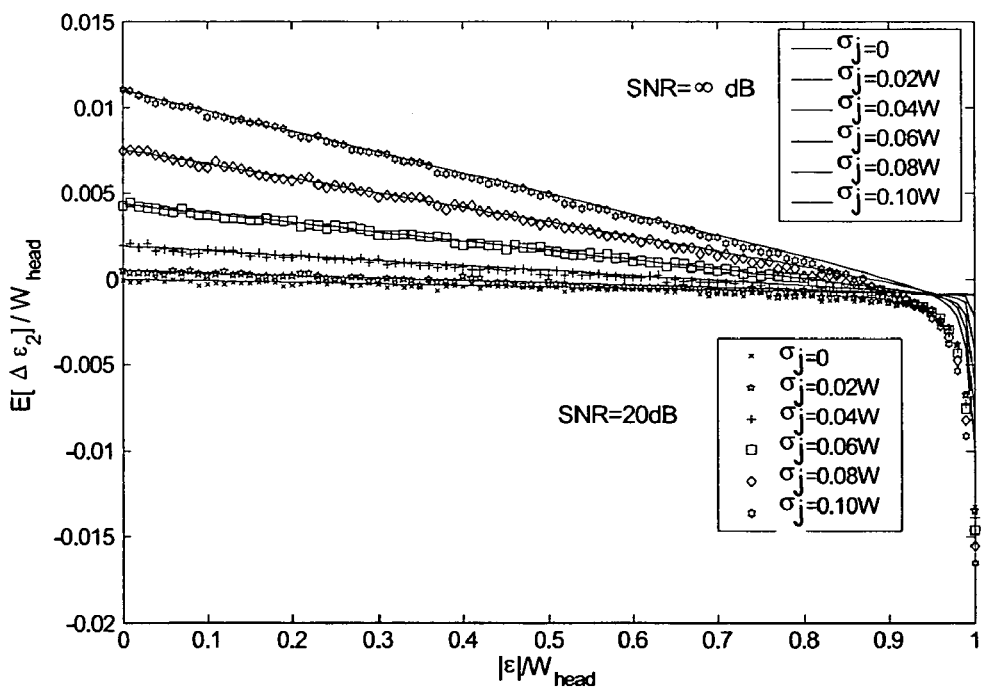
FIG. 6B is a graphical illustration of the effect of non-zero bias on the estimation error from a second position estimation signal.

As discussed above, the system is known to have electronics noise and jitter as noise inputs. The nature of the interference from this noise needs to be determined before any compensation can be accomplished. That is, the source of the non-zero bias of position estimation needs to be determined. The electronics noise can be eliminated in the model 300 by setting the signal to noise ratio, $SNR = \infty dB$, thereby showing the effect of servo jitter on the non-zero bias. FIGS. 6A-6B show the position estimation error for $PES_1$ and $PES_2$ with and without the effects of electronics noise. From these results, it can be seen that when $$\frac{|\varepsilon|}{W_{track}} > 0.2,$$

the difference in the mean of the estimation bias $E|\Delta\varepsilon_1|$ between when SNR=20 dB and when SNR=∞dB is negligible. Further, when $$\frac{|\varepsilon|}{W_{track}} < 0.8,$$

the difference in $E|\Delta\varepsilon_2|$ between when SNR=20 dB and when SNR=∞dB is negligible. Thus, the non-zero bias of position estimation mean, $E|\Delta\varepsilon_i|$ is dominated by jitter of servo marks for the given ranges ($E|\Delta\varepsilon_1|$ within $|\varepsilon| \in [0.2,1]W_{track}$ and $E|\Delta\varepsilon_2|$ within $|\varepsilon| \in [0, 0.8]W_{track}$. Therefore, the jitter of servo marks is shown to be the dominant source of position estimation error in the illustrative aspect. Further, as can be seen in FIGS. 6A-6B, the non-zero bias can be as high as 1%. Although the non-zero bias is not large, it may be accumulated over time. Eventually, the accumulation of bias can lead to mispositioning of the write transducer so that servo marks could be rewritten back at a shifted position. As a result, the rewriting of servo marks could deviate so far from the expected position that the erasing-rewriting system could potentially stop working. Thus, the non-zero bias of position estimation should be compensated to account for the effects of jitter of servo marks. It should be understood that other noise sources may cause the non-zero bias of position estimation in other systems. Thus, the compensation of the particular noise source can be accomplished using similar techniques as those described below with respect to jitter of servo marks.

1. Compensation of the Jitter of Servo Marks

The position estimation can be compensated by subtracting the non-zero bias from the estimated position. If the non-zero bias is represented as $f_i(\varepsilon)$, then the non-zero bias can be written as $$E[\Delta\varepsilon_1] = f_1(\varepsilon).$$

$E[\Delta\varepsilon_1]$ is charted against transducer displacement as a percentage of the track width FIG. 6A. A compensated displacement, $\hat{\varepsilon}'$, can be written as $$\hat{\varepsilon}' = \hat{\varepsilon}_1 - f_1(\varepsilon),$$

which can provide a straight forward compensation. However, the actual transducer displacement, $\varepsilon$, is unknown. Instead, the actual track transducer displacement $\varepsilon$ can be replaced with an estimate of the displacement, $\hat{\varepsilon}$, where:

$$[|\$]\$\hat{}\$\$[|\$]\$\hat{} A\hat{X}[|\$]\$\hat{}g\hat{\varepsilon}_1 = \hat{\varepsilon}_1 - f_1(\hat{\varepsilon}_1)$$

The estimation for track transducer displacement $\hat{\varepsilon}$ can be used because $f_1(\varepsilon)$ is a continuous function with respect to $\varepsilon$ as is shown in FIGS. 5A-5C. Therefore, $f_1(\varepsilon)$ is close to $f_1(\hat{\varepsilon}_1)$, the estimated non-zero bias. Further, the relationship between $f_1(\varepsilon)$ and SNR in the illustrative aspects has been shown to be very weak as the difference in the transducer displacement is negligible when SNR=20 dB as when the SNR=∞dB. Thus, simulations for $f_1(\varepsilon)$ can be done at a single SNR level, and the data points collected can be used as an estimate for an estimated non-zero bias $f_1(\hat{\varepsilon}_1)$ at any SNR. Further, since $f_1(\varepsilon)$ is continuous, the non-zero bias for any $\varepsilon$ can be interpolated from the data points that have been previously collected. The estimation error after compensation is defined as $\hat{\Delta\varepsilon}_1 = [|\$]\$\hat{}\$\$[|\$]\$\hat{} A\hat{X}[|\$]\$\hat{}g\hat{\varepsilon}_1 - |\varepsilon|$.

Figure 7A:
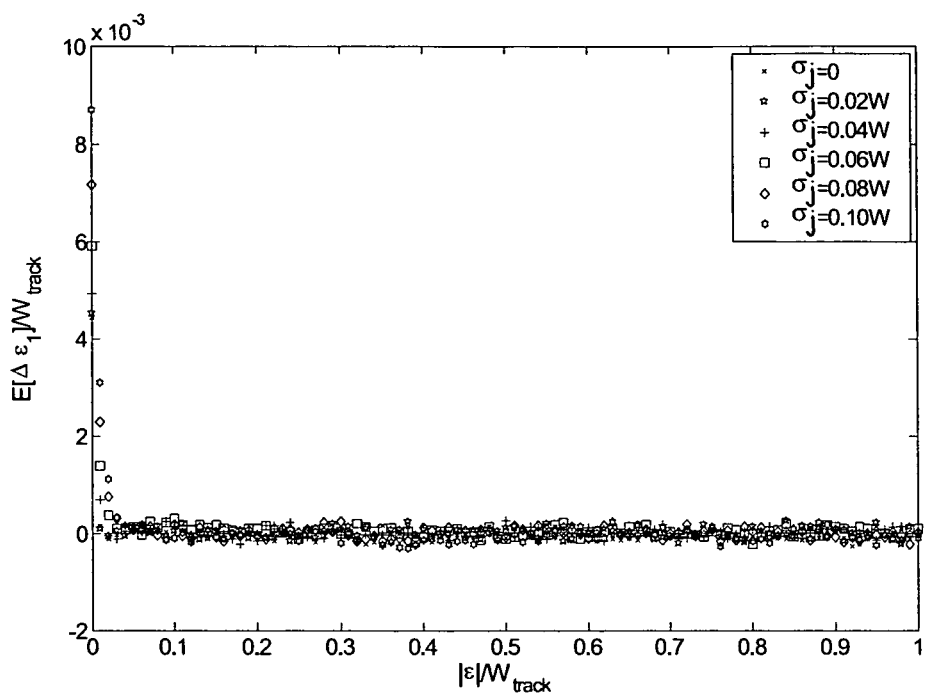
FIG. 7A is a graphical illustration of the estimation error from the first position estimation signal after compensation.
Figure 7B:
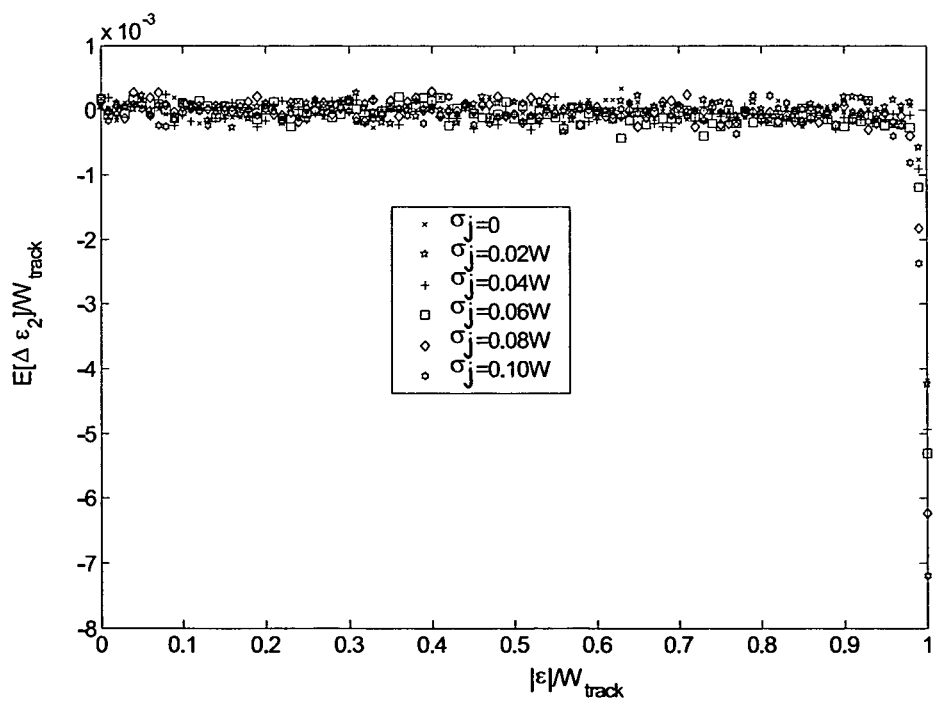
FIG. 7B is a graphical illustration of the estimation error from the second position estimation signal after compensation.

The efficiency of the compensation method described above has been simulated, and the results are shown in FIGS. 7A-7B. FIG. 7A shows the mean estimation error from $PES_1$ after compensation and FIG. 7B shows the mean estimation error from $PES_2$ after compensation. Compared to $E[\Delta\varepsilon_1]$, $E[\hat{\Delta\varepsilon}_1]$ is decreased by at least one order of magnitude. Similarly, $E[\hat{\Delta\varepsilon}_2]$ is significantly decreased for $\varepsilon \in [0, 0.8]W_{track}$. Although the variance of the estimation error is increased after compensation, that increase is negligible.

After combining the non-zero bias of position estimation, there are two estimations of $\epsilon$, $[|\$]\$\hat{}\$\$[|\$]\$\hat{}\ A\hat{X}[|\$]\$\hat{}g\hat{e}_1$, and $[|\$]\$\hat{}\$\$[|\$]\$\hat{}\ A\hat{X}[|\$]\$\hat{}g\hat{e}_2$. By combining the two estimations as described below, a better estimate of $\epsilon$ can be achieved. The basic algorithm, described above, is as follows:

$$[|\$]\$\hat{}\$\$[|\$]\$\hat{}\ A\hat{X}[|\$]\$\hat{}g\hat{e} = c_1[|\$]\$\hat{}\$\$[|\$]\$\hat{}\ A\hat{X}[|\$]\$\hat{}g\hat{e}_1 + c_2[|\$]\$\hat{}\$\$[|\$]\$\hat{}\ A\hat{X}[|\$]\$\hat{}g\hat{e}_2$$

If $[|\$]\$\hat{}\$\$[|\$]\$\hat{}\ A\hat{X}[|\$]\$\hat{}g\hat{e}_1 \leq 0.2W_{track}$, then $c_1=0$ and $c_2=1$. If $[|\$]\$\hat{}\$\$[|\$]\$\hat{}\ A\hat{X}[|\$]\$\hat{}g\hat{e}_2 \geq 0.8W_{track}$, then $c_1=1$ and $c_2=0$. $[|\$]\$\hat{}\$\$[|\$]\$\hat{}\ A\hat{X}[|\$]\$\hat{}g\hat{e}_1 \geq 0.2W_{track}$ and $[|\$]\$\hat{}\$\$[|\$]\$\hat{}\ A\hat{X}[|\$]\$\hat{}g\hat{e}_2 \geq 0.8W_{track}$, then $$\begin{cases} c_1 + c_2 = 1 \\ \dfrac{c_1}{c_2} = \sqrt{\dfrac{Var[\hat{\epsilon}_2]}{Var[\hat{\epsilon}_1]}} \end{cases}$$

2. Robustness of the Method for Compensation of the Jitter of Servo Marks

The compensation factor, $f_i(\epsilon)$, $i=1,2$, described above, has been studied to determine its robustness against electronics noise and the uncertainty of the jitter of servo marks, particularly as it relates to track incoherence.

Electronics noise e(t) is characterized by zero mean and the single sided power spectral density of $N_0=10^{-SNR/10}$. It is difficult to know SNR precisely, so it is useful to have a compensation function or non-zero bias function $f_i(\epsilon)$, $i=1,2$ that is robust, with respect to SNR. As described above, when $\epsilon > 0.2W_{track}$, the $E|\Delta\epsilon_1|$, that is, $f_1(\epsilon)$, between when SNR=20 dB and when SNR=∞dB is negligible. Therefore $f_1(\epsilon)$ is robust when $\epsilon > 0.2W_{track}$. In addition, when $\epsilon < 0.8W_{track}$, the difference in $E|\Delta\epsilon_2|$ between when SNR=20 dB and when SNR=∞dB is negligible. Therefore $f_2(\epsilon)$ is robust when $\epsilon < 0.8W_{track}$. The compensation algorithm described above is thus robust.

In probe storage, the dual frequency pattern, $\omega_1$ and $\omega_2$, of servo marks shown above with respect to FIG. 3A requires at least two rewriting passes. Due to the non-synchronous property of the ordinary write transducer, these two rewriting passes may have a relative shift of $\Delta$, shown in FIG. 8, which is known as track incoherence. Track incoherence $\Delta$ can affect the periodicity of the readback signal $y_i(kT)$, $i=1,2$, especially at the edges, which can degrade the performance of the position estimation. In one illustrative aspect, the problem of track incoherence is avoided by cutting off the edges of the readback signal. Portions of the readback signal in the transducer and tail areas of the signal can be discarded such that the length of the portion discarded at the transducer $\Delta_H$ and the tail $\Delta_T$ (as shown in FIG. 8) are both greater than the track incoherence, $\Delta$. One additional feature with respect to $\Delta_H$ and $\Delta_T$ is that the length of the effective signal area are multiples of the periods of servo patterns as is also shown in FIG. 8.

Figure 9A:
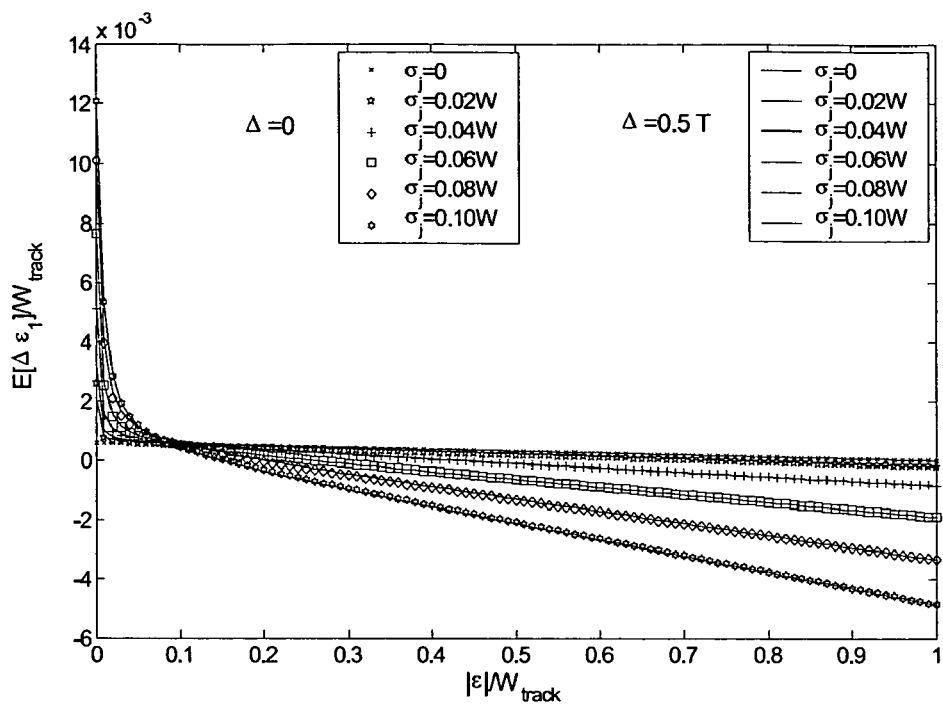
FIG. 9A is a graphical illustration of the effects of track incoherence on the estimation error from the first position estimation signal after compensation.
Figure 9B:
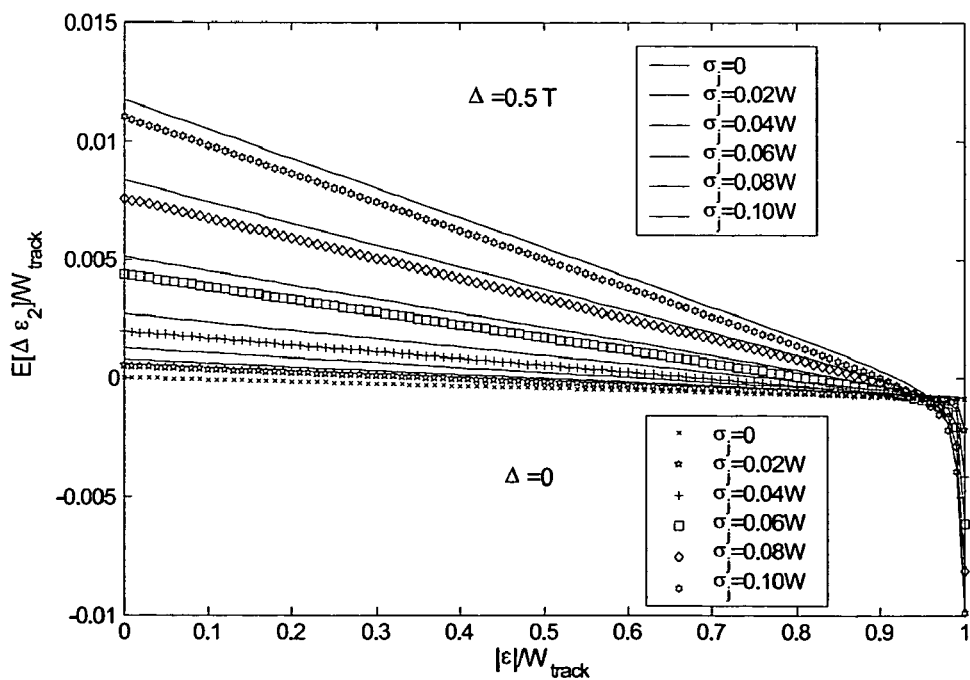
FIG. 9B is a graphical illustration of the effects of track incoherence on the estimation error from the second position estimation signal after compensation.

FIGS. 9A-9B illustrate the results of simulations used to verify the robustness of $f_i(\epsilon)$ against track incoherence $\Delta$. FIG. 9A shows the results of a simulation of $f_1(\epsilon)$ when $\Delta=0$ and $\Delta=0.5T$, and FIG. 9B shows the results of a simulation of $f_2(\epsilon)$ when $\Delta=0$ and $\Delta=0.5T$. The $f_1(\epsilon)$ function is robust to track incoherence. There are some minor differences in $f_2(\epsilon)$ from when $\Delta=0$ to $\Delta=0.5T$, but the differences are negligible. Thus, the compensation methods of the illustrative aspects are robust to track incoherence.

The compensation system above can be implemented in a device such as a probe storage system, in one illustrative aspect, by creating a table of data that provides estimations $f_i(\epsilon)$ of the non-zero bias of position of the servo marks such as in the transducer positioning circuitry 110. The desired position to write a servo mark on the storage medium 102 is estimated to be $\hat{\epsilon}_i$, $i=1,2$. Then the non-zero bias $f_i(\epsilon)$ is subtracted from $\hat{\epsilon}_i$ to generate position estimation with no bias $[|\$]\$\hat{}\$\$[|\$]\$\hat{}\ A\hat{X}[|\$]\$\hat{}g\hat{e}_i$. The components of the position estimation with no bias, $[|\$]\$\hat{}\$\$[|\$]\$\hat{}\ A\hat{X}[|\$]\$\hat{}g\hat{e}_1$ and $[|\$]\$\hat{}\$\$[|\$]\$\hat{}\ A\hat{X}[|\$]\$\hat{}g\hat{e}_2$ are combined as described above to produce the final position estimation that is robust to noise.

The illustrative aspects described above provide numerous advantages. For example, data read by the data transducer is compensated, providing a better estimate of the intended data written than that of the data subjected to the jitter noise. In addition, the compensated data is rewritten onto the servo tracks, thereby reducing the accumulation of non-zero bias. In addition, the compensation can be accomplished with little or no added complexity to control circuitry for a transducer positioning device. This leads to an efficient and cost effective implementation.

It is to be understood that even though numerous characteristics and advantages of the various aspects have been set forth in the foregoing description, together with details of the structure and function of various aspects, this disclosure is illustrative only, and changes may be made in detail, especially in matters of structure and arrangement of parts within the principles of the present aspects to the full extent indicated by the broad general meaning of the terms in which the appended claims are expressed. For example, the particular elements may vary depending on the particular application for the data storage system while maintaining substantially the same functionality without departing from the scope and spirit of the present aspects. In addition, although the aspects described herein are directed to compensating the position of data transducers in a data storage system for the noise of servo jitter, it will be appreciated by those skilled in the art that the teachings of the present aspects can be applied to other systems that utilize transducer positioning. In addition, the teachings can be applied to compensating for noise sources other than that jitter of servos, without departing from the scope and spirit of the present aspects.

What is claimed is:

1. A method, comprising:
   reading data from a data storage medium related to servo marks stored on a first track at a first frequency and servo marks stored on a second track stored at a second frequency, wherein reading the data causes the data to be erased from the medium;
   determining a desired position to rewrite the data onto the data storage medium, including:
      computing a position error signal based on the read data; and
      compensating the position error signal for non-zero bias; and
   rewriting the data onto the data storage medium in a non-synchronous manner.

2. The method of claim 1 wherein the step of computing the position error signal comprises computing a first position error signal component and computing a second position error signal component.

3. The method of claim 1 wherein the step of reading the data includes reading data with a data communication transducer in communication with the data storage medium and further comprising estimating a displacement of the data communication transducer relative to the first track and the second track.

4. The method of claim 1 wherein the step of compensating the position error signal comprises accessing previously stored compensation data.

5. The method of claim 4 wherein the step of compensating the position error signal further comprises summing previously stored compensation data with the position error signal.

6. The method of claim 5, wherein the step of compensating the position error signal includes summing previously stored compensation data with the first position error signal component and with the second position error signal component to compensate the first and second position error signal components.

7. The method of claim 1 wherein the step of compensating the position error signal comprises compensating the signal for the effects of servo jitter.

8. A method, comprising:
   reading data from a data storage medium including reading servo marks located on a first track and a second track at the same time, and wherein reading the data causes the data to be erased from the medium; and
   rewriting the data onto the data storage medium, including:
      determining a desired position to write the data that was read from the first track on the first track by computing a position error signal based on the data that was read from the first track and compensating the position error signal for non-zero bias;
      writing the data that was read from the first track onto the first track; and
      determining a desired position to write the data that was read from the second track onto the second track.

9. The method of claim 8 further comprising determining a displacement of the data communication transducer relative to the data storage medium.

10. The method of claim 8 wherein the step of receiving the data includes receiving data signals from a first data track and a second data and wherein the data signal from the first data track is provided at a first frequency and the data signal from the second data track is provided at a second frequency.

11. The method of claim 8 wherein the step of computing the position error signal includes computing a first position error signal component and a second position error signal component.

12. The method of claim 11 wherein the step of compensating the error signal includes summing a first compensation factor with the first position error signal component.

13. The method of claim 8 wherein the step of compensating the error signal includes accessing a previously stored compensation function.

14. An apparatus, comprising:
   a data storage medium having a plurality of tracks;
   a data communication transducer configured to read data from the data storage medium, wherein the data is erased after it is read and wherein the data communication transducer is configured to rewrite the read data back onto the data storage medium in a non-synchronous manner, including writing servo marks on a first track at a first frequency and a second track at a second frequency; and
   a compensator configured to compensate the read and erased data for non-zero bias to calculate a position error signal based on the read data for determining a desired position to rewrite the read data back onto the data storage medium.

15. The apparatus of claim 14, wherein the data communication transducer is configured to write servo marks on a first track and a second track and wherein the servo marks on the second track are written out of phase from the servo marks on the first track.

16. The apparatus of claim 14 wherein the data communication transducer is configured to simultaneously read data from the first track and the second track.

* * * * *